United States Patent [19]

Pilukaitis et al.

[11] Patent Number: 4,504,898
[45] Date of Patent: Mar. 12, 1985

[54] START-UP TRANSIENT CONTROL FOR A DC-TO-DC CONVERTER POWERED BY A CURRENT-LIMITED SOURCE

[75] Inventors: Raymond W. Pilukaitis, Byram Township, Sussex County; Thomas G. Wilson, Jr., Morristown, both of N.J.

[73] Assignee: AT&T Bell Laboratories, Murray Hill, N.J.

[21] Appl. No.: 501,298

[22] Filed: Jun. 6, 1983

[51] Int. Cl.³ .............................. H02M 3/335
[52] U.S. Cl. ........................ 363/49; 363/21; 323/285; 323/901
[58] Field of Search ................. 363/18–21, 363/56–57, 49; 323/901, 908, 285

[56] References Cited

U.S. PATENT DOCUMENTS

| | | | |
|---|---|---|---|
| 4,215,392 | 7/1980 | Rhoads | 363/49 |
| 4,233,557 | 11/1980 | Alberkrack | 363/21 X |
| 4,246,634 | 1/1981 | Purol | 363/49 |
| 4,370,701 | 1/1983 | Western | 363/49 X |

OTHER PUBLICATIONS

"Start-Up Transient of a DC-to-DC Converter Powered by a Current-Limited Source", *IEEE Transactions On Aerospace and Electronic Systems*, vol. AES-17, No. 3, May 1981, T. G. Wilson, Jr., pp. 351–363.
W. A. Moorman, "Transistor Switching Regulator Start Circuit", *IBM Technical Disclosure Bulletin*, vol. 13, No. 9, Feb. 1971, pp. 2763–2764.

Primary Examiner—Peter S. Wong
Attorney, Agent, or Firm—Alfred G. Steinmetz

[57] ABSTRACT

The start-up trajectory of the operating point of a DC-to-DC converter normally includes a high current locus which must be traversed to reach the steady-state operating point. In the case of a converter powered by a current-limited source, such as a power supply system where one converter powers a plurality of subsequent converters, the subsequent converters may be unable to turn on due to inadequate current drive. By using a control circuit adapted to control the start-up trajectory of a DC-to-DC converter as a continuous function of the input voltage applied to it by the current-limited source, the start-up characteristics are constrained to be compatible to both source and load permitting the converter to proceed to its steady-state operating point.

17 Claims, 11 Drawing Figures

START-UP TRANSIENT CONTROL FOR A DC-TO-DC CONVERTER POWERED BY A CURRENT-LIMITED SOURCE

TECHNICAL FIELD

This invention relates to energy storage-type DC-to-DC converters with a regulated output and, more particularly, to controlling the start-up transient of such a DC-to-DC converter powered by a current-limited source to permit reliable consistent start-ups.

BACKGROUND OF THE INVENTION

The operating point in the V-I plane (input voltage-current) of an energy storage-type DC-to-DC converter during start up follows a particular trajectory, until an equilibrium or steady-state operating point locus is attained, at which the converter operating point is stabilized. This operating point lies on a locus of steady-state operating points upon which the converters output is regulated. If the power source energizing the converter is current-limited, such as may be the case when converters are cascaded, or power is supplied through a long transmission line, conditions due to loading circuit components may be such that the source output current characteristic, combined with the start-up trajectory of the converter, defines an equilibrium operating point off the curve of steady-state operating points, so that the converter is unable to fully turn on to supply its regulated output. A detailed discussion of the start-up phenomena may be found in a published paper, by T. G. Wilson, Jr., entitled "Start-Up Transient of a DC-to-DC Converter Powered By a Current-Limited Source," and appearing in *IEEE Transactions on Aerospace and Electronic Systems*, Vol. AES-17, No. 3, May 1981, pages 351–363.

If, as indicated in the cited reference, the source powering the DC-to-DC converter is unable to supply the needed current level, the converter fails to reach an equilibrium operating point at which its regulated output voltage can be supplied and, hence, does not properly startup. Solutions in the prior art to counteract this tendency to not properly start have included soft-start techniques, which involve gradually turning on the converter by timing techniques that slow the rate of rise of the output voltage, and techniques operating the converter power switch at a fixed maximum duty cycle during start up until a preset output voltage threshold is reached. This soft-start solution is very time dependent; that is, it has a fixed duration of operation every time the converter is turned on and is, hence, an unsatisfactory arrangement if the converter is to be used in situations where required time constants may vary due to the source current capabilities varying or input or output capacitance of the converter varying. The technique of fixing a maximum duty cycle of the power switch is disadvantageously very sensitive to changes in the value of the fixed maximum duty cycle value wherein a very small shift in the duty cycle induces large changes in the converter characteristic as examined in the input current vs. input voltage plane.

Another prior art approach is to use a start-up circuit with a breakdown device that prohibits the power switch from conducting until a breakdown voltage level is attained at the input. That has the effect of horizontally shifting the start-up trajectory to vertically lower the intersection of the start-up ascent trace and the locus of steady-state operating points, so that the operating point may reach its desired equilibrium operating point. However, this technique does not work in all situations even though it modifies the static input voltage vs. input current characteristic of the converter such that the input current of the converter never exceeds the source current. The dynamic characteristics may still allow the input current to exceed the source characteristics. This may prevent the converter from properly starting.

SUMMARY OF THE INVENTION

A control circuit in a DC-to-DC converter embodying the principles of the invention is operative to control the start-up trajectory of the converter operating point as a continuous function of the input voltage, and further cooperates with control circuitry to regulate an output voltage of the converter after an equilibrium operating point is reached. At a preset range of starting voltages, the static input voltage vs. input current characteristic is shaped so that the slope is finite and positive. This is achieved by a control law that is a continuous function of the input voltage to the converter. Specific methods to achieve this include varying the duty cycle of a constant frequency pulse width modulated converter, adjusting a peak current of a peak current controlled converter or changing the reference level in the output voltage regulation control circuit. Beyond this range, the converter operation is controlled in response to an output voltage regulation control circuit.

Once the static or DC input current vs. input voltage characteristic of the converter is shaped such that this characteristic never exceeds the source characteristic, this start-up control scheme is fully operative, despite variations in source and load characteristics. It adaptively controls the start-up trajectory of the converter so that the input current to the converter does not exceed the source current and, hence, a unitary design insures start up in a variety of applications. It also insures that the output voltage of the converter rises monotonically as a function of time despite these variations. Because the circuit adapts to changes in input capacitance, output capacitance, and current capability of the source, it insures the above properties, provided that the static input characteristic does not exceed the source characteristic.

DETAILED DESCRIPTION

Figure 1:
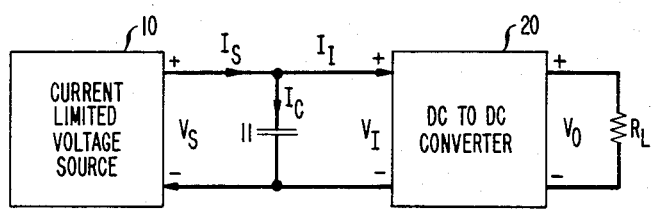
FIG. 1 is a block diagram of a DC-to-DC converter being powered from a current-limited source.
Figure 2:
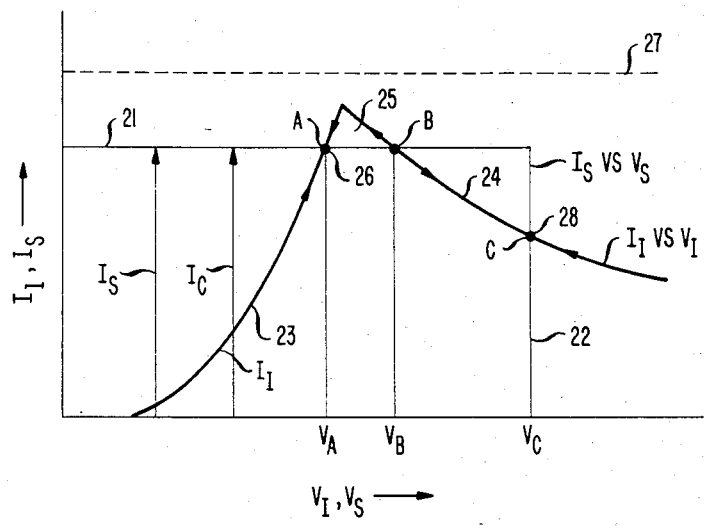
FIG. 2 is a typical current-limited source voltage current characteristic superimposed upon a startup trajectory in the V-I plane of a DC-to-DC converter.

A block diagram of a DC-to-DC converter, driven by a current-limited source, as shown in FIG. 1, discloses a DC voltage source 10 coupled to power a DC-to-DC converter 20, which operates by power switching and energy storage to convert one DC voltage level to another DC voltage level. Such a current-limited source 10 could be a high impedance source, such as a power supply supplying power to the converter over a long transmission loop, or a current-limited power supply, such as a current-limited DC-to-DC converter. The output current from source 10 charges capacitor 11, and supplies current to the input of converter 20. The output characteristics of source 20 are shown as the constant current trace 21 and constant voltage trace 22 in FIG. 2. The operating characteristics of the converter 20 are shown by the trajectory of the converter's operating point in its input voltage-input current plane, where we define the start-up trajectory as the path that the operating point $(V_I, I_I)$ follows in this plane during start up, and the static start-up trajectory as the start-up trajectory that is approached as we decrease the rate at which $V_I$ increases from 0 to $V_c$. This trajectory includes a start-up ascent trace 23 and a locus of steady-state operating points 24. The operating point experiences a transition from one curve to another at the point 25 or intersection of the two curves 23 and 24. Initially at start-up, the source current is supplied to charge capacitor 11. As capacitor 11 charges, the operating point of the converter ascends the ascent trace 23. The operating point, while ascending the ascent trace 23, may, as shown, attempt to exceed the current limit of the current limited voltage source 10 at locus 26. Had the source 10 been able to supply a current level, as indicated by dotted line 27, the operating point would have proceeded to the transition locus 25, and then continued along the constant power curve 24 until it reached its steady-state equilibrium operating point, which may have occurred at point 28. However, with the current limit at line 21, the converter operating point cannot proceed beyond point 26; and the converter fails to properly operate to supply its regulated output.

Figure 3:
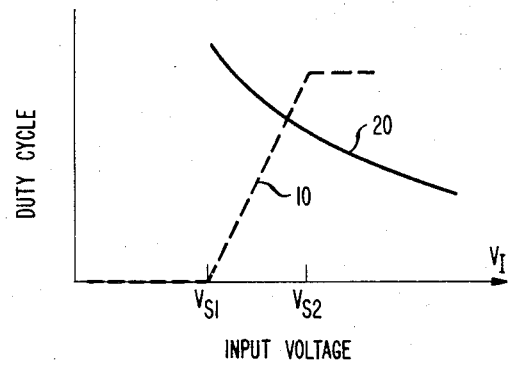
FIG. 3 is a graphical depiction of the duty cycle response of the adaptive start-up control law to input voltage.
Figure 4:
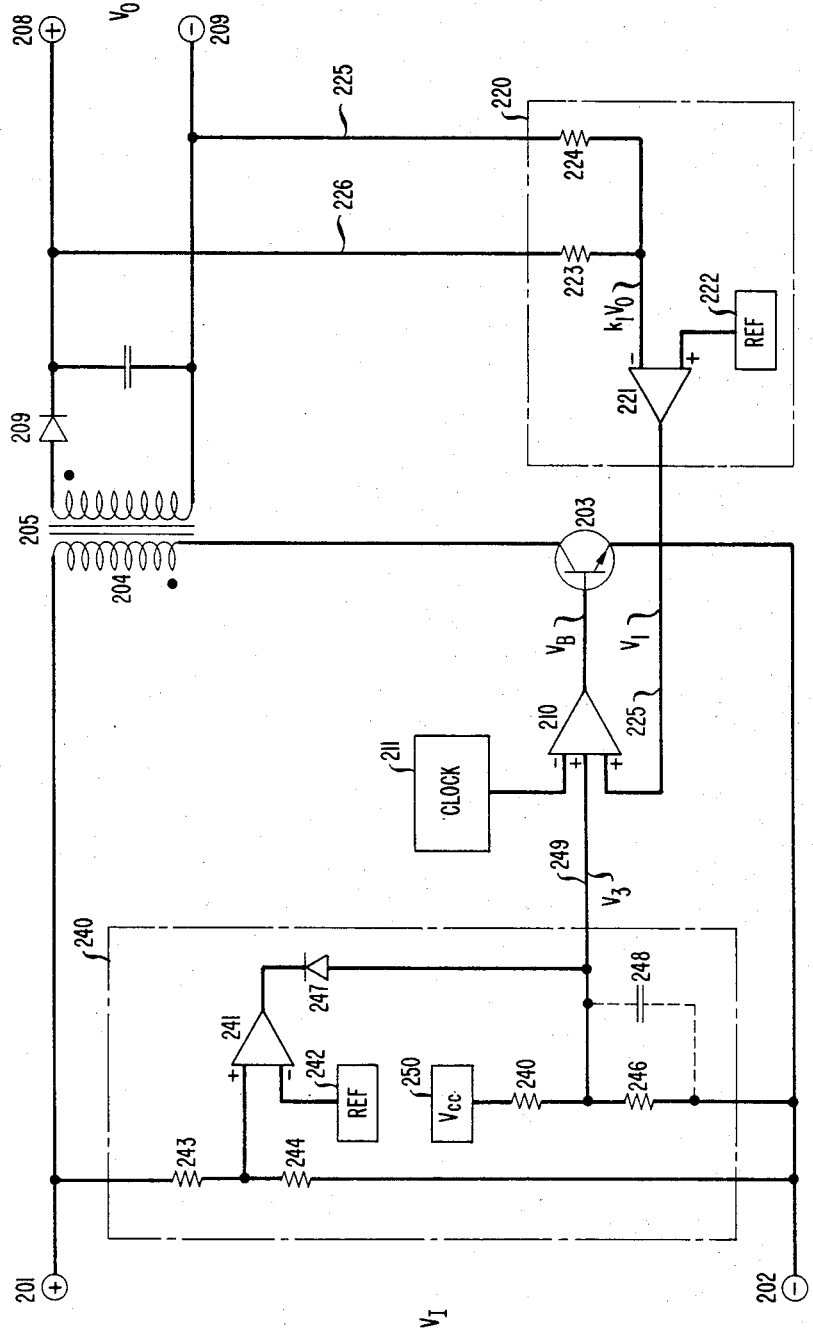
FIG. 4 is a schematic of a regulated energy storage-type DC-to-DC converter including a start-up control circuit embodying the principles of the invention.

A DC-to-DC converter, which is expected to be powered by a current-limited source, and which includes control circuitry operative to alleviate the start-up problem, is disclosed in FIG. 4. For start-up purposes, the duty cycle of the power switch is made responsive to the input voltage. The control is defined for an extended start-up voltage range, which includes the voltage at which the transition point occurs. Control is such that, within the range, the duty cycle of the power switch increases proportionately as the input voltage increases. This control technique becomes readily apparent upon examination of FIG. 3 which diagrammatically illustrates the duty cycle control characteristic utilized to assure start up. The adaptive input control characteristic is represented by the dotted line 10. The normal steady-state operating curve is shown by the solid line 20. Within the range $V_{s1}$ to $V_{s2}$, the controller is made responsive to the sensed input voltage. Within this range, the duty cycle of the power switch is shown as a linear function of the input voltage although the invention herein is not to be construed to be limited to linear characteristics. At higher input voltages to the right of $V_{s2}$, the first start-up controller is superceded by a controller responding to a sensed output voltage, and which varies the duty cycle of the power switch so that the output voltage is maintained at a regulated value.

The adaptive nature of the start-up circuit results from its low gain in the range from $V_{s1}$ to $V_{s2}$. It is intended to operate within this range for significant portions of the start-up transient, rather than operating as a switch, turning the converter on or off at some given input voltage. Typically, the range $V_{s2}-V_{s1}$ is 20% of $V_{s1}$.

A single-ended flyback converter disclosed in FIG. 4 operates with a current-limited DC voltage source applied to the input terminals 201 and 202. The converter circuit includes a power switch 203 which is periodically driven conducting by a comparator circuit 210. When conducting, the power switch 203 couples the input DC voltage at the input terminals 201 and 202 to the primary winding 204 of the power transformer 205. The power transformer 205 includes a secondary winding 207, which is coupled through a rectifying diode 206 to output terminals 208 and 209, which are normally connected to a load to be energized. Since the converter circuit is driven by a current-limited source, control circuits are included to provide the necessary start-up characteristics, and also the desired output voltage regulation. As shown, the converter circuit includes two such control circuits. One is an output voltage-sensing controller 220 to regulate the output voltage at output terminals 208 and 209. The second control circuit is an input voltage-sensing controller 240 which, in response to a sensed input voltage, controls the start-up of the converter, as discussed above, so that the operating point does not hang up at point 26 at the current limit level of the supply source coupled to the input terminals 201 and 202.

Figure 5:
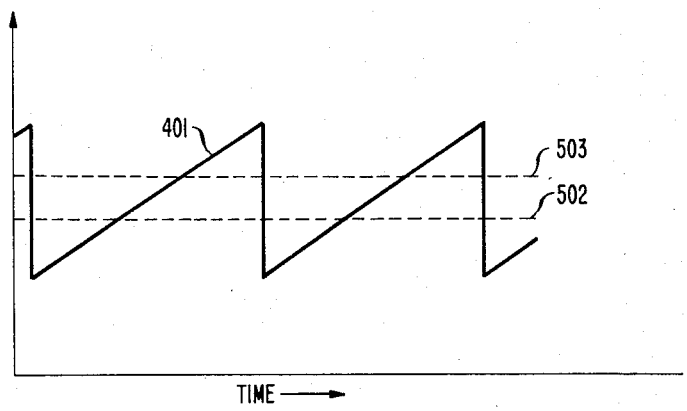
FIGS. 5 and 6 show waveforms of the switching characteristics of the converter circuit shown in FIG. 3.
Figure 6:
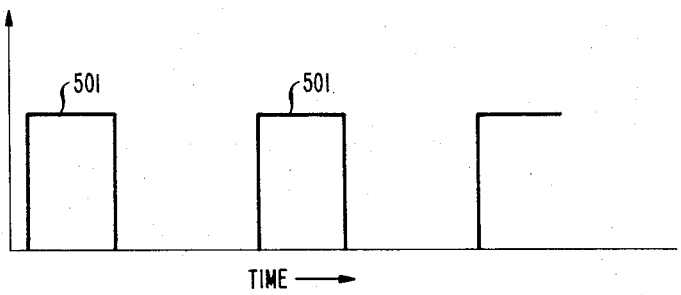

The power switch 203 is periodically driven into conduction by the output of a comparator 210, which is responsive to a clock ramp waveform source 211 and control voltages supplied by the output or regulation control 220 and input or start-up control 240. As shown in FIG. 3, the comparator 210 has three inputs. The inverting input is driven by a ramp waveform generated by a periodic clock source 211. The two noninverting inputs are connected to the outputs of the input and output controllers 240 and 220, respectively. The operation of the comparator 210 is such that its output is high to supply a drive pulse to drive the power switch 203 conducting only when the voltage on both of the noninverting inputs are greater than the ramp waveform of the ramp generator 211 supplied to the inverting input. The cooperative operation of these control circuits may be readily understood by reference to the illustrative waveforms shown in FIGS. 5 and 6, where it is obvious that the duty cycle of the drive waveform 501 shown in FIG. 6 depends upon the relative values of the ramp waveform 401 generated by the clock and the respective output voltages of each of the controllers 220 or 240 designated, as illustratively shown, with dotted line 503 representing the output voltage level of the input controller 240, and dotted line 502, representing the output voltage level of the output controller 220. As is readily apparent from the waveforms shown, the lower-valued control voltage determines the duty cycle. Hence, as shown with the illustrative waveforms, since the regulation control voltage 502 is lower in magnitude than the start-up control voltage 503, the regulation control voltage determines the duty cycle. If the magnitudes were reversed, and 502 became the start-up control voltage, the start-up control voltage would then control the duty cycle of the power switch 203.

The regulation controller 220 senses a fraction of the output voltage by sensing a voltage at the center tap of a voltage divider comprising resistors 223 and 224 shunting the output. This voltage is applied to the inverting input of an amplifier 221. Amplifier 221 must have a high DC gain to attain the desired voltage regulation. It compares the output voltage fraction with a reference voltage supplied by reference voltage source 222. The resulting error voltage output of amplifier 221 is coupled via lead 225 to a noninverting input of the comparator 210. The start-up controller 240 is also coupled to a voltage divider comprising resistors 243 and 244 shunting the input terminals 201 and 202, and includes an amplifier 241, which compares a voltage from the divider representing a fraction of the input voltage with a reference voltage supplied by reference voltage source 242. Amplifier 241 is preferably a low-gain amplifier having a bandwidth which is on the order of the switching frequency of the converter. The results of this comparison is a difference, or start-up control, voltage which is applied, via lead terminal 249, to comparator 210. This start-up voltage is limited in the maximum value it can attain by a voltage divider comprising resistors 245 and 246 energized by a separate voltage source 250. This voltage divider, in combination with a diode 247, is connected between the output of the amplifier 241 at lead 249 and the output of the start-up circuit 240.

Resistors 245 and 246 and diode 247 cooperate as a limit circuit to see that the start-up control voltage cannot exceed a maximum value. This effectively limits the maximum duty cycle that the power switch can attain in response to the voltage output of the start-up control circuit 240.

As long as the output voltage is less than its regulated value, the regulation control voltage may be at such a level that it may attempt to require a duty cycle greater than some desired maximum duty cycle critical to the start-up process. However, in those situations, the duty cycle value will be determined by the start-up control voltage. If the output voltage is greater than the regulated voltage once start-up has been attained, it is readily apparent that the regulation control signal will control the duty cycle of the power switch.

Figure 7:
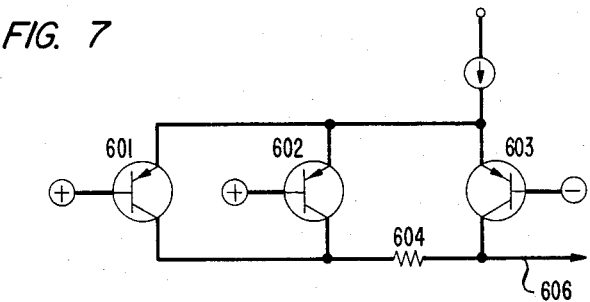
FIG. 7 is a schematic of an input stage of a comparator circuit suitable for use with the control circuitry shown in FIG. 3.

A suitable comparator circuit is disclosed in FIG. 7 wherein two transistors 601 and 602, responsive to the start-up and regulation control voltages, respectively, are both connected in shunt connection with a series-connected transistor 603 and resistor 604, the base of this transistor 603 being responsive to the periodic ramp voltage generated by the clock. The three parallel paths are energized by the current source 605, and it is readily apparent that either the start-up control voltage or the regulation control voltage, whichever is the lower, will determine at what point a signal is produced on output lead 606 of this comparator circuit, which, in turn, is utilized to couple drive signals to the power switch 203.

The advantage of this start-up circuit is that it adapts to variations in source and load conditions, such as input and output capacitance and current-limiting characteristics of the source, in order to insure start up of the converter. It also insures that the output voltage increases monotonically with time. Whenever the output 249 of the start-up controller is lower than the control voltage 225, the start-up controller responds to force the start-up trajectory below the source characteristic. In order to insure that all of these dynamic properties are achieved, the start-up controller should shape the static start-up trajectory so that it is beneath the source characteristic.

The new adaptive control circuit does not require a soft-start feature in order to insure the properties described in the previous paragraph. However, it is sometimes advantageous to use soft start for other reasons. A capacitor 248, shunting resistor 246, may function to limit the rise of the start-up control voltage during start-up time and, hence, assures a soft-start effect without detracting from the positive benefits of the continuous input voltage-responsive control. However, the adaptive start-up control eliminates the need for this capacitor if the sole purpose of this capacitor is to insure proper converter start up.

Figure 8:
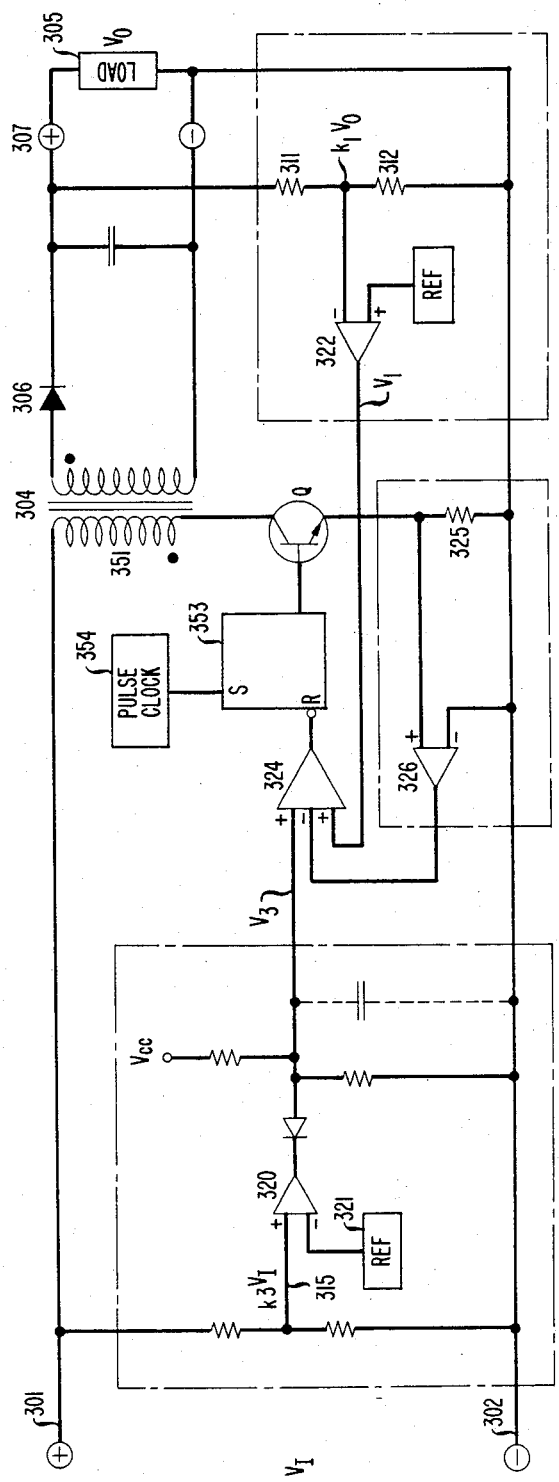
FIG. 8 is a schematic of a DC-to-DC converter using peak current-type regulation control and including a start-up control circuit embodying the principles of the invention.

The voltage regulator disclosed in FIG. 8 is a DC-to-DC flyback converter in which regulation is by peak current control techniques. Voltage from a current-limited source is applied to input terminals 301 and 302. The power switch transistor 303 is driven at a controlled duty cycle by the output of flip-flop 353 and couples the DC voltage to primary transformer winding 351. Energy is periodically stored in the core of transformer 304 when power switch 303 conducts, and is delivered, via rectifying diode 306, to the load 305 when the switch 303 is nonconductive.

An input DC voltage of the converter is sensed via a voltage divider comprising resistors 313 and 314 and coupled via lead 315 to a noninverting input of operational amplifier 320. A reference voltage from source 321 is connected to the inverting input of amplifier 320.

Similarly, an output voltage of the converter is sensed at lead 307, and is coupled via a voltage divider comprising resistors 311 and 312 to an inverting input of operational amplifier 322. A reference voltage of voltage source 371 is connected to the noninverting input. The outputs of amplifiers 320 and 322 are connected to noninverting inputs of a multi-input comparator circuit 324.

Current flow through power switch 303 is sensed by sensing a voltage across resistor 325 with op amp 326. The output of amplifier 326 is connected to an inverting input of comparator circuit 324.

Figure 9:
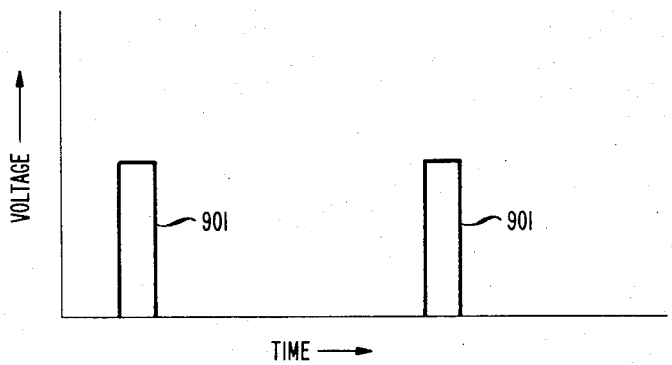
FIGS. 9, 10 and 11 show waveforms associated with the converter circuit of FIG. 8.
Figure 10:
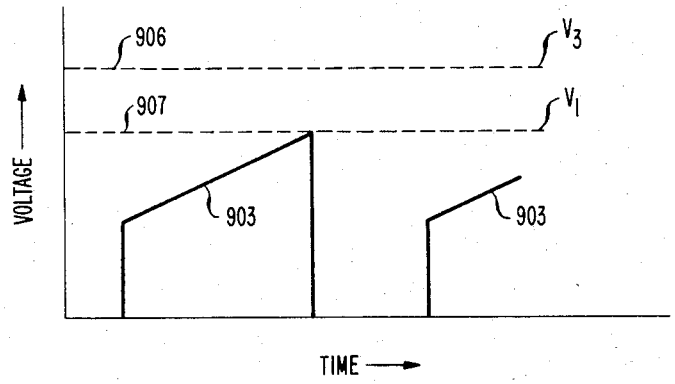
Figure 11:
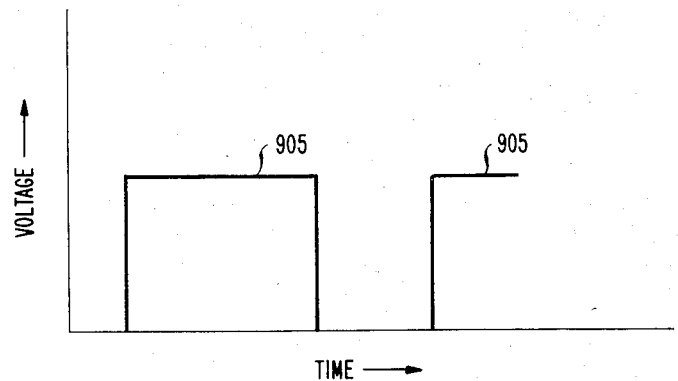

The comparator 324 supplies a high output to flip-flop 353 as long as the two inputs at the noninverting inputs exceed the amplitude of the inverting input. Flip-flop 353 is periodically set by pulse clock 354 as shown by pulses 901 in FIG. 9 to supply a drive signal to bias power switch 303. The current through power switch 303 increases as a current ramp. This current ramp is sensed by amplifier 326 across resistor 325 and is amplified as voltage waveform 903 shown in FIG. 10. Comparator 324 compares waveform 903 with voltage levels 906 and 907 which represent output levels of amplifiers 320 and 322. Either value may at times be the greater depending on the time of operation. During conduction of power switch 303, a pulse of voltage 905 (FIG. 11) is applied to primary winding 351. This voltage pulse continues until ramp voltage 903 reaches level 906 or 907 whereupon flip-flop 353 is reset and the power switch is biased nonconducting by the output of flip-flop 353.

It is apparent in the case of comparator 324 that the lower input voltage of the voltages applied to the noninverting inputs will control the threshold at which the comparator changes state and resets flip-flop 353 to bias power switch nonconducting and terminate the voltage pulse. Hence, either the sensed output voltage or the sensed input voltage will control the output of the comparator 324. The sensed output voltage is controlling for voltage regulation; and the sensed input voltage is controlling for start-up operation. This start-up circuit has the same advantages as the one discussed previously in FIG. 4.

What is claimed is:

1. A power converter comprising:
   input means for accepting a voltage source,
   output means for accepting a load,
   a power switch for coupling energy from the input means to the output means,
   first means for generating a start-up difference voltage by comparing a voltage at the input means with a reference voltage,
   second means for generating a regulation error voltage by comparing a voltage at the output means with a reference voltage,
   drive means for controlling a periodic conduction interval of the power switch and operative in response to a greater magnitude of values of the start-up difference voltage and the regulation error voltage,
   whereby respective amplitudes of the start-up difference voltage and the regulation error voltage are such that a periodic conduction of the interval power switch is determined by the start-up difference voltage at start-up and a periodic conduction interval of the power switch during steady state operation following start-up is determined by the regulation error voltage.

2. A power converter comprising:
   input means for accepting a voltage source,
   output means for accepting a load,
   a power switch for coupling energy from the input means to the output means,
   a start-up control means operative for comparing a voltage at the input means with a reference voltage and generating a start-up difference voltage,
   drive means including multiple control input terminals and a first one of the control input terminals responsive to the start-up difference voltage, and operative for controlling a periodic conduction interval of the power switch, and
   voltage regulation means responsive to a voltage at the output means and operative for generating a regulation error voltage coupled to a second one of the control input terminals, and
   means for assigning control of conduction intervals of the power switch to a specific one of the multiple control input terminals based on relative voltage amplitudes,
   whereby respective amplitudes of the start-up difference voltage and regulation error voltage is such that the regulation error voltage is responded to by the drive means to control the periodic conduction interval of the power switch after start-up of the converter merges into steady-state operation.

3. A power converter as defined in claim 2 wherein the start-up control means further includes limit means for limiting an amplitude of the start-up difference voltage whereby a maximum periodic conduction interval limit for the power switch is set.

4. A power converter as defined in claim 3 wherein the limit means further includes integrating means for controlling a rate of rise of the start-up difference voltage during start-up.

5. A power converter as defined in claim 2 wherein the means for assigning control include at least a first and second transistor having a main conduction path connected in parallel, and having control electrodes responsive to the start-up difference voltage and the regulation error voltage, respectively.

6. A power converter as defined in claim 2 wherein the start-up control means includes a first operational amplifier having its noninverting input coupled to sense a voltage at the input means and an inverting input coupled to a first reference voltage, and
   the voltage regulation control means include a second operational amplifier having its inverting input coupled to sense a voltage at the output means and a noninverting input coupled to a second reference voltage.

7. A power converter circuit as defined in claim 6 wherein the drive means includes a periodic ramp waveform generator and a comparator having an inverting input responsive to the ramp waveform generator, and first and second noninverting inputs responsive to the first and second operational amplifiers, respectively.

8. A power converter comprising:
   input means for accepting a voltage source,
   output means for accepting a load,
   a power switch for coupling energy from the input means to the output means,
   a start-up control means operative for comparing a voltage at the input means with a reference voltage and generating a start-up difference voltage,
   drive means, responsive to the start-up difference voltage, for controlling a periodic conduction interval of the power switch, the drive means including multiple control input terminals one of which is coupled to receive the start-up difference voltage,
   means for replacing control of conduction of the power switch by the start-up control means with alternate regulation control means once a start-up of the converter merges into steady-state operation,
   the means for replacing including means for assigning control to a specific one of the multiple control input terminals based on relative voltage amplitude, and
   the alternate regulation control means including peak current control means responsive to a current in the power switch including means for generating a voltage error voltage proportional to a deviation of an output voltage from a desired value, means for providing a voltage proportional to current in the power switch and means for coupling the means for generating and the means for providing to separate one of the control input terminals, whereby, current in the power switch is adjusted to maintain a desired output voltage.

9. A DC-to-DC converter coupled to be powered by a current limited source comprising:
   input means to accept the current limited source,
   output means to accept a load,
   a power switch for controlling current flow between the input means and the output means,
   first means for controlling a periodic conduction interval of the power switch during start-up so that the periodic conduction interval of the power switch is a continuous function of a signal magnitude at the input means, second means for controlling a periodic conduction interval of the power switch during steady-state operation of the converter so that the periodic conduction interval of the power switch is a function of a signal magnitude at the output means, and means for transferring control from the first means to the second means in response to relative amplitudes of control signals generated by the first and second means, whereby, control is transferred from the first means to the second means after operation of the converter has transcended a start-up region.

10. A DC-to-DC converter coupled to be powered by a current limited source comprising:

input means to accept the current limited source, output means to accept a load, a power switch for controlling current flow between the input means and the output means, drive means for controlling a periodic conduction interval of the power switch and including a comparator having a first and second input for control signals where respective amplitudes of the control signal at the first and second input determine which control signal determines a duty cycle of the periodic conduction interval, first means for generating a control signal applied to the first input of the comparator for controlling the power switch during start-up so that a periodic conduction interval of the power switch is a continuous function of a voltage at the input means, and second means for generating a control signal applied to the second input of the comparator for controlling a periodic conduction interval of the power switch during steady-state operation of the converter, whereby the comparator is operative for transferring control from a control signal at the first input of the comparator to a control signal at the second input of the comparator after operation of the converter has transcended a start-up region.

11. A DC-to-DC converter as defined in claim 10 and further including a voltage regulation control for regulating an output voltage and including means for generating an error voltage representation of a deviation of the output voltage from its regulated value and means for coupling the error voltage to the second input for control signals.

12. A DC-to-DC converter as defined in claim 10 and further including peak current control means responsive to a current level in the power switch for controlling a periodic conduction interval of the power switch.

13. A DC-to-DC converter as defined in claim 11 wherein the first means for controlling includes difference amplification means for generating a start-up control voltage responsive to a difference between an input voltage at the input means and a reference voltage, and means for setting a maximum permissible voltage for the start-up control voltage.

14. A DC-to-DC converter as defined in claim 13 wherein the first means for controlling further includes means for controlling a rate of increase of the start-up control voltage.

15. A DC-to-DC converter as defined in claim 14 wherein the difference amplification means includes an operational amplifier for deriving a difference voltage from the input voltage and the reference voltage which has a bandwidth on the order of the switching frequency of the power switch.

16. A DC-to-DC converter as defined in claim 14 wherein the means for generating an error voltage comprises a low frequency operational amplifier with high gain.

17. A DC-to-DC converter adapted to start-up while being energized by a current limited source comprising:

input means for accepting a source of energy, output means for accepting a load, a power switch coupled for controlling energy flow between the input means and the output means, first means for generating a first signal representative of a signal magnitude at the input means, second means for generating a second signal representative of a signal amplitude at the output means, means for controlling a duty cycle of the power switch in response to one of the first and second signals, the means for controlling including means for selecting the one of the first and second signals to which the means for controlling a duty cycle will respond on the basis of a present state of the operational mode of the converter, whereby, the first signal is used for a start-up mode of operation and the second signal is used for a steady-state mode of operation.

* * * * *